United States Patent
Muldoon et al.

(10) Patent No.: US 11,746,664 B2
(45) Date of Patent: Sep. 5, 2023

(54) GEARED GAS TURBINE ENGINE WITH FRONT SECTION MOMENT STIFFNESS RELATIONSHIPS

(71) Applicant: Raytheon Technologies Corporation, Farmington, CT (US)

(72) Inventors: Marc J. Muldoon, Marlborough, CT (US); Michael E. McCune, Colchester, CT (US); Keith B. Allyn, Rutland, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/483,210

(22) Filed: Sep. 23, 2021

(65) Prior Publication Data

US 2023/0090152 A1   Mar. 23, 2023

(51) Int. Cl.
   *F01D 9/04* (2006.01)
   *F01D 25/28* (2006.01)
   *F01D 25/16* (2006.01)

(52) U.S. Cl.
   CPC ........... *F01D 9/041* (2013.01); *F01D 25/162* (2013.01); *F01D 25/28* (2013.01); *F05D 2220/32* (2013.01)

(58) Field of Classification Search
   CPC ........ F01D 25/16; F01D 25/162; F01D 25/24; F01D 25/246; F01D 25/28; F01D 9/02; F01D 9/04; F01D 9/041; F01D 9/042; F05D 2220/32; B64D 27/16; B64D 27/18; B64D 27/20; B64D 27/26
   See application file for complete search history.

(56) References Cited

U.S. PATENT DOCUMENTS

| | | | |
|---|---|---|---|
| 5,452,575 A | * | 9/1995 | Freid ..................... B64D 27/26 244/54 |
| 7,845,158 B2 | | 12/2010 | Udall |
| 8,911,203 B2 | | 12/2014 | Reinhardt et al. |

(Continued)

FOREIGN PATENT DOCUMENTS

EP   3009618 A1   4/2016

OTHER PUBLICATIONS

Partial European Search Report for EP Application No. 22197224.3 dated Jun. 28, 2023.

*Primary Examiner* — Woody A Lee, Jr.
*Assistant Examiner* — Elton K Wong
(74) *Attorney, Agent, or Firm* — Carlson, Gaskey & Olds, P.C.

(57) ABSTRACT

A gas turbine engine includes a fan rotor driven by a fan drive turbine about an axis through a gear reduction. An inner core engine has an inner core engine housing surrounding a compressor section, including a low pressure compressor. A rigid connection between a fan case and the inner core engine includes A-frames rigidly connected at a connection point to the fan case. Fan exit guide vanes rigidly connect to the fan case, and to the inner core engine. A fan intermediate case is positioned forward of a first rotor stage in the low pressure compressor. A rigid structure is connected to the inner core engine and to the fan exit guide vanes. The rigid structure defines a structure moment stiffness. The fan intermediate case defines an intermediate case moment stiffness. A ratio of the structure moment stiffness to the intermediate case moment stiffness is between 5 and 15.

14 Claims, 3 Drawing Sheets

(56) References Cited

U.S. PATENT DOCUMENTS

| | | | |
|---|---|---|---|
| 2004/0108413 A1 | 6/2004 | Thompson | |
| 2013/0084174 A1* | 4/2013 | Maalouf | F02K 3/06 |
| | | | 415/208.1 |
| 2014/0020404 A1* | 1/2014 | Sheridan | F02C 7/06 |
| | | | 60/805 |
| 2015/0052908 A1 | 2/2015 | Todorovic | |
| 2020/0003122 A1 | 1/2020 | Wilshaw | |
| 2020/0284222 A1* | 9/2020 | Suciu | F01D 25/28 |

\* cited by examiner

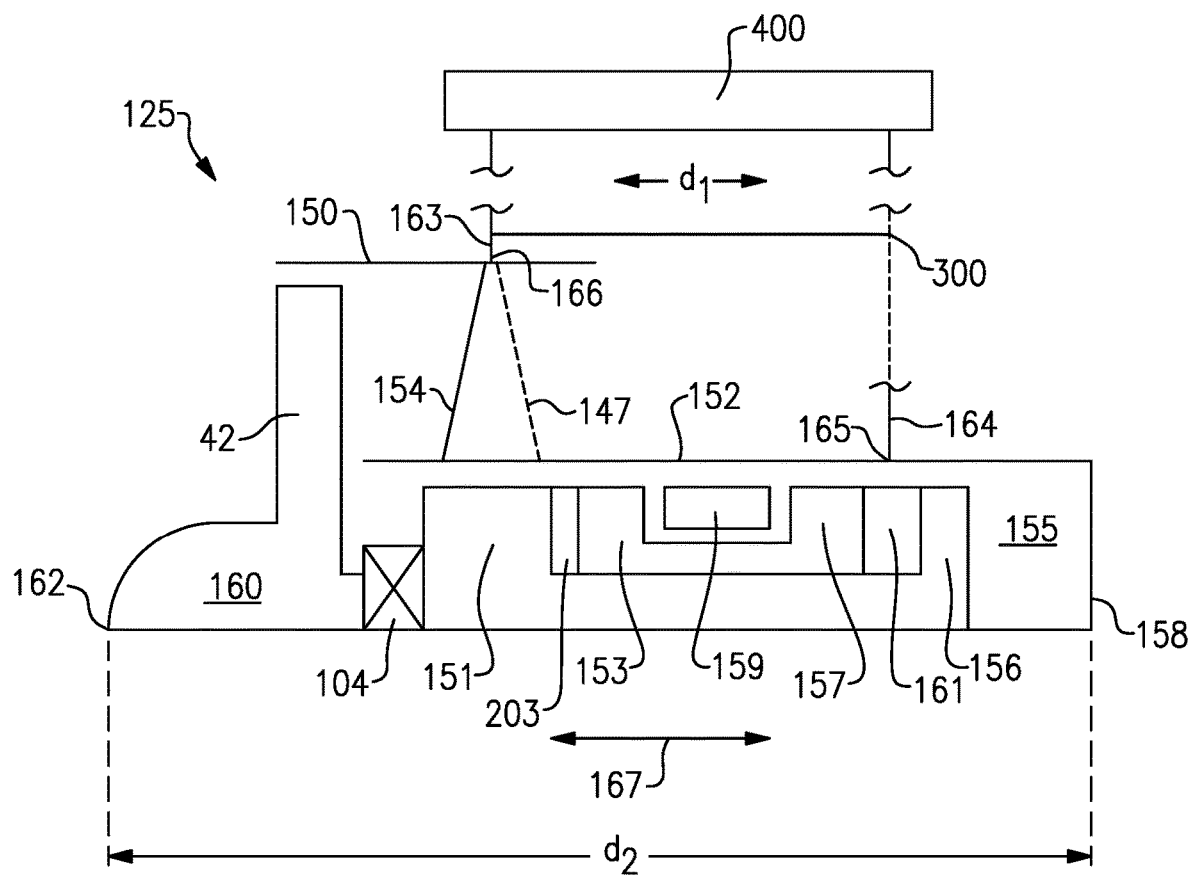
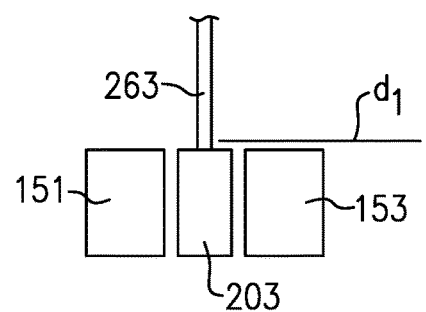
FIG.3A
FIG.3B

GEARED GAS TURBINE ENGINE WITH FRONT SECTION MOMENT STIFFNESS RELATIONSHIPS

BACKGROUND OF THE INVENTION

This application relates to torsional stiffness relationships in the front section of a gas turbine engine that incorporates a gear reduction between a fan drive turbine and a fan rotor.

Gas turbine engines are known, and typically include a fan delivering air into a bypass duct to provide propulsion. The fan also delivers air into a compressor section in a core engine. The compressor compresses the air and delivers it into a combustor where it is mixed with fuel and ignited. Products of this combustion pass downstream over turbine rotors, driving them to rotate. The turbine rotors in turn rotate the fan rotor and fan compressor rotors.

Historically, a fan drive turbine drove the fan rotor at a common speed, along with driving a low pressure compressor. However, more recently, a gear reduction has been incorporated between the fan drive turbine and the fan rotor such that the fan rotor rotates at slower speeds. The incorporation of the gear reduction at a front section of the gas turbine engine raises mounting challenges.

SUMMARY OF THE INVENTION

In a featured embodiment, a gas turbine engine includes a fan rotor driven by a fan drive turbine about an axis through a gear reduction to reduce a speed of the fan rotor relative to a speed of the fan drive turbine. A fan case surrounds the fan rotor, and an inner core engine has an inner core engine housing surrounding a compressor section, including a low pressure compressor. The fan rotor delivers air into a bypass duct defined between the fan case and a splitter wall of the inner core housing. A rigid connection is between the fan case and the inner core engine including a plurality of A-frames each including a pair of legs rigidly connected at a connection point to the fan case. Each leg in the pair extends away from the connection point in opposed circumferential directions to be connected to the inner core engine to form an A-shape. A plurality of fan exit guide vanes rigidly connect to the fan case, and are rigidly connected to the inner core engine. A fan intermediate case is positioned within the inner compressor wall forward of a first rotor stage in the low pressure compressor. A rigid structure is connected to the inner core engine and to the fan exit guide vanes. The rigid structure defines a structure moment stiffness. The fan intermediate case defines an intermediate case moment stiffness. A ratio of the structure moment stiffness to the intermediate case moment stiffness is between 5 and 15.

In another embodiment according to the previous embodiment, a combination of the plurality of A-frames, and the plurality of fan exit guide vanes, together define an outer mount moment stiffness, and a ratio of the structure moment stiffness to the outer mount moment stiffness being between 1.5 and 8.

In another embodiment according to any of the previous embodiments, the engine has a forwardmost point and a rearwardmost point. An axial length of the engine is defined between the forwardmost and rearwardmost points. A forward mount is attached at a forward location on the fan case. A rearward mount is attached on the inner core housing. The forward mount and the rearward mount attach the engine to an aircraft. A mount distance is defined between a trailing edge of the first mount and a trailing edge of the second mount. A ratio of the mount distance to the overall length of the engine is between 0.4 and 0.7.

In another embodiment according to any of the previous embodiments, the forward mount is aligned with at least a portion of the fan exit guide vanes.

In another embodiment according to any of the previous embodiments, the engine has a forwardmost point and rearwardmost point and an axial length of the engine defined between the forwardmost and the rearwardmost points. A forward mount is attached at a forward location to a compressor intermediate case which is intermediate the low pressure compressor and a high pressure compressor. A rearward mount is attached to the inner core housing. The forward mount and the rearward mount attach the engine to an aircraft. A mount distance is defined between a trailing edge of the first mount and a trailing edge of the second mount and a ratio of the mount distance to the overall length of the engine is between 0.4 and 0.6.

In another embodiment according to any of the previous embodiments, a single line can pass through a portion of the fan exit guide vanes, the rigid structure, and the fan intermediate case.

In another embodiment according to any of the previous embodiments, the low pressure compressor has four to six stages.

In another embodiment according to any of the previous embodiments, the fan exit guide vanes extend at a first angle from a radially inner end to a radially outer end. The first angle has a radially outward component and an axially aft component. The A-frame legs extend from a radially inner connection to the inner core engine to the connection point with the fan case at a second angle having a component in a radially outward direction, and in an axially forward direction.

In another embodiment according to any of the previous embodiments, the A-frame legs are connected to the inner core engine at a compressor intermediate case defined between the low pressure compressor and a high pressure compressor.

In another embodiment according to any of the previous embodiments, the rigid structure is fixed to the fan intermediate case.

In another featured embodiment, a gas turbine engine includes a fan rotor driven by a fan drive turbine about an axis through a gear reduction to reduce a speed of the fan rotor relative to a speed of the fan drive turbine. A fan case surrounds the fan rotor. An inner core engine has an inner core housing surrounding a compressor section, including a low pressure compressor. The fan rotor delivers air into a bypass duct defined between the fan case and a splitter wall of the inner core housing. A rigid connection is between the fan case and the inner core engine including a plurality of A-frames each including a pair of legs rigidly connected at a connection point to the fan case. Each leg in the pair extend away from the connection point in opposed circumferential directions to be connected to the inner core engine to form an A-shape. A plurality of fan exit guide vanes rigidly connect to the fan case, and are rigidly connected to the inner core engine. A fan intermediate case is positioned within the inner compressor wall forward of a first rotor stage in the low pressure compressor. A rigid structure is connected to the inner core engine and the fan exit guide vanes. The rigid structure defines a structure moment stiffness, a combination of the plurality of A-frames, and the plurality of fan exit guide vanes, together defining an outer mount moment stiffness. A ratio of the structure moment stiffness to the outer mount moment stiffness is between 1.5 and 8.

In another embodiment according to any of the previous embodiments, the engine has a forwardmost point and a rearwardmost point. An axial length of the engine is defined between the forwardmost and rearwardmost points. A forward mount is attached at a forward location on the fan case or compressor intermediate case. A rearward mount is attached to the inner core housing. The forward mount and the rearward mount attach the engine to an aircraft. A mount distance is defined between a trailing edge of the first mount and a trailing edge of the second mount. A ratio of the mount distance to the overall length of the engine is between 0.4 and 0.7.

In another embodiment according to any of the previous embodiments, the engine has a forwardmost point and rearwardmost point. An axial length of the engine is defined between the forwardmost and the rearwardmost points. A forward mount is attached at a forward location to a compressor intermediate case which is intermediate the low pressure compressor and a high pressure compressor. A rearward mount is attached to the inner core housing. The forward mount and the rearward mount attach the engine to an aircraft. A mount distance is defined between a trailing edge of the first mount and a trailing edge of the second mount and a ratio of the mount distance to the overall length of the engine is between 0.4 and 0.6.

In another embodiment according to any of the previous embodiments, a single line can pass through a portion of the fan exit guide vanes, the rigid structure, and the fan intermediate case, and the low pressure compressor has four to six stages.

In another featured embodiment, a gas turbine engine includes a compressor section having a low pressure compressor, a high pressure compressor and a compressor intermediate case. A fan rotor is driven by a fan drive turbine about an axis through a gear reduction to reduce a speed of the fan rotor relative to a speed of the fan drive turbine. A fan case surrounds the fan rotor, and an inner core housing surrounds the compressor section and a turbine section. A first mount for the engine is attached to one of the fan case or the compressor intermediate case. A second mount for the engine is attached to the inner core housing. The first and second mount attach the engine to an aircraft. An axial length of the engine is defined between a forwardmost point of the engine and a rearwardmost point of the engine. A mount distance is defined between a trailing edge of the first mount and a trailing edge of the second mount, with each of the trailing edges measured from a radially innermost end. A ratio of the mount distance to the axial length is between 0.4 and 0.7 if the first mount is attached to the fan case, and is between 0.4 and 0.6 when the forward mount is attached to the compressor intermediate case.

In another embodiment according to any of the previous embodiments, the low pressure compressor has four to six stages.

In another embodiment according to any of the previous embodiments, there is a high pressure turbine driving a high pressure compressor. A mid-turbine frame is defined between the high pressure turbine and the fan drive turbine. The second mount is attached to the inner core housing at a location aligned with the mid-turbine frame.

In another embodiment according to any of the previous embodiments, a plurality of fan exit guide vanes connect the fan case to the inner core housing. The first mount is on the fan case at an axial location aligned with a radially outermost edge of the plurality of fan exit guide vanes.

In another embodiment according to any of the previous embodiments, the first mount is attached to the compressor intermediate case.

In another embodiment according to any of the previous embodiments, there are a plurality of A-frames each including a pair of legs rigidly connected at a connection point to the fan case. Each leg in the pair extends away from the connection point in opposed circumferential directions to be connected to the inner core engine.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 3A shows a second feature of this disclosure.
FIG. 3B shows another embodiment of the second feature.

DETAILED DESCRIPTION

Figure 1:
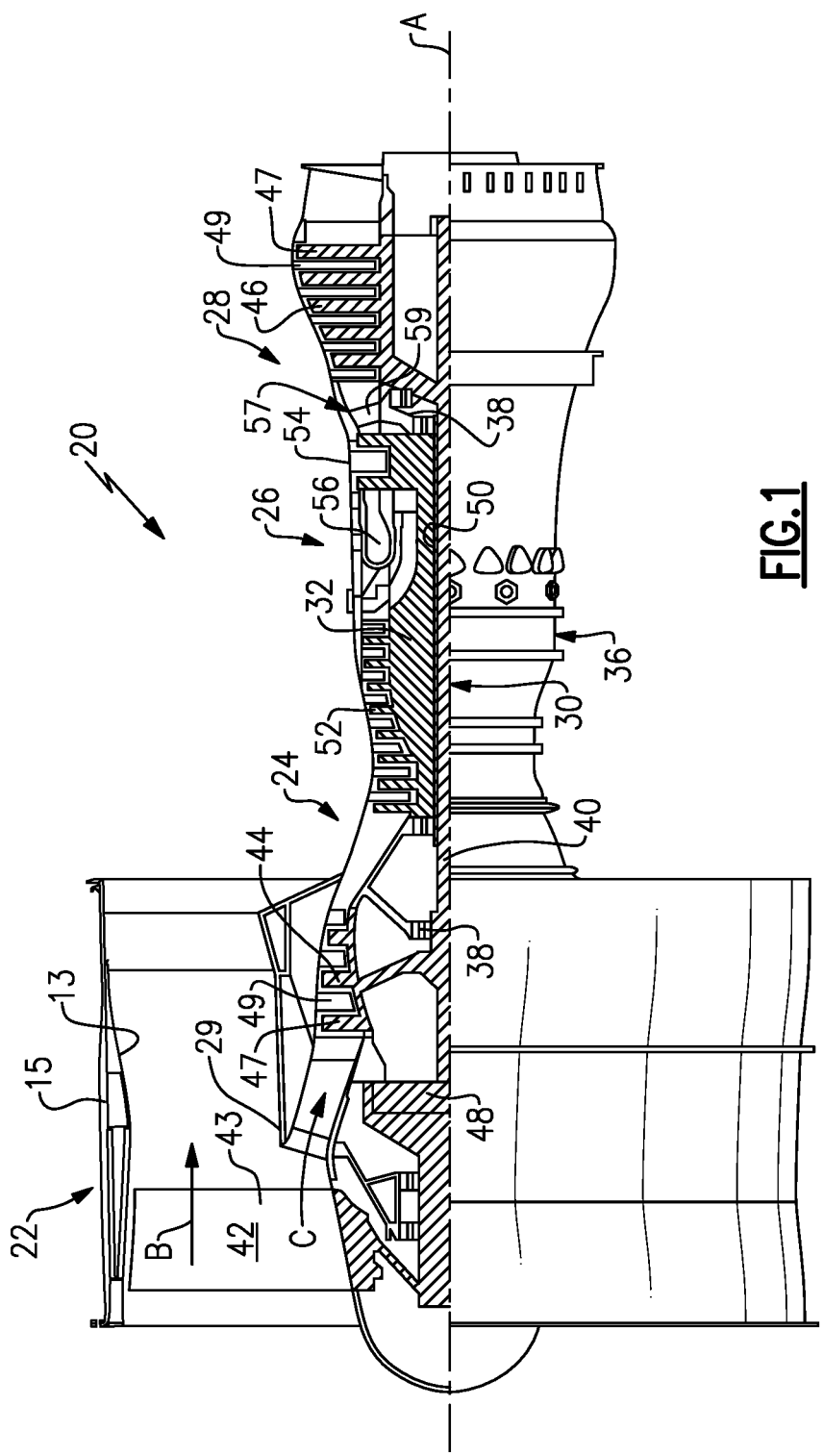
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 38 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent to the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ ^\circ R)/(518.7^\circ R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a product of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 7.0 and 12.0, or more narrowly is between 10.0 and 11.5. The OPR can be equal to or greater than 44.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
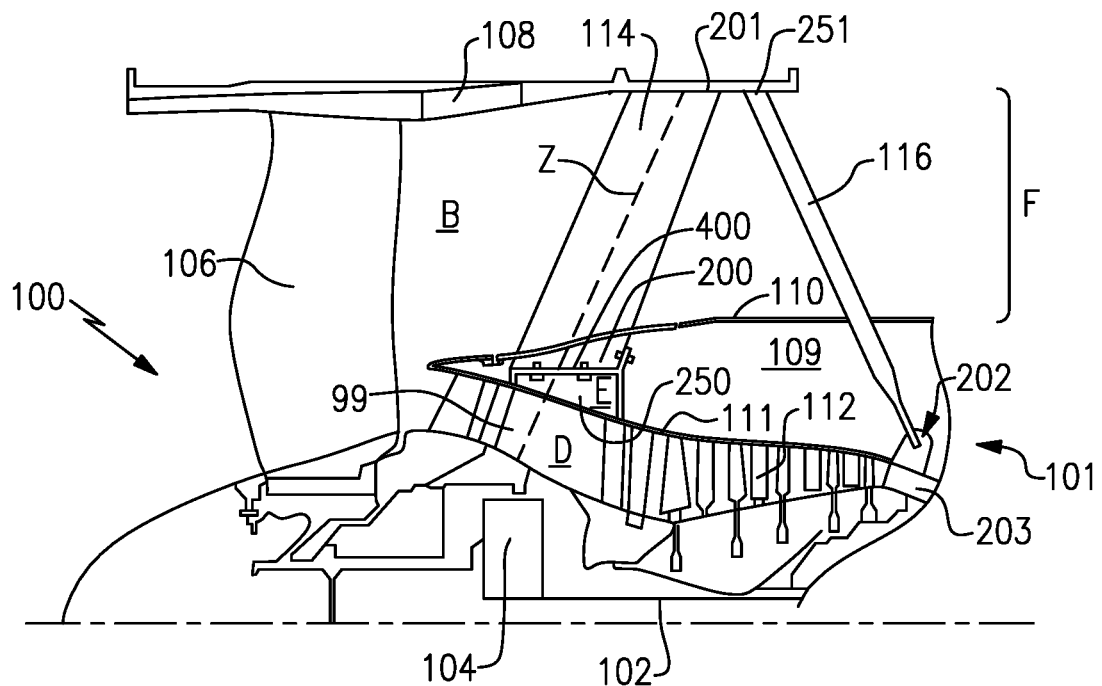
FIG. 2A shows a front section of a gas turbine engine.

FIG. 2A shows an engine 100, which may be similar to the engine 20 of FIG. 1. A shaft 102 is driven by a fan drive turbine to drive a fan rotor 106 through a gear reduction 104. The drive connection here may be generally as described above with regard to FIG. 1. A fan case 108 surrounds the fan rotor 106, and an inner core housing 101 may include a splitter wall 110 that surrounds compressor housing wall 111. The inner core housing 101 houses a low pressure compressor 112, and a high pressure compressor, combustor and turbine sections (not shown in this Figure) within wall 111. The wall 111 must be rigidly connected to the fan case 108, to address torque and other loads. A torque case 109 is defined between walls 110 and 111.

Applicant has previously developed a geared gas turbine engine. In this first generation engine the fan case 108 was connected to the compressor housing wall 111 through a plurality of fan exit guide vanes. Each of these fan exit guide vanes were structural elements that provided a load path between the fan case 108 and the core engine. In engine 100 there may be fewer structural fan exit guide vanes 114. Non-structural guide vanes may include acoustic treatment. A-frames 116 have been added to provide additional rigidity. The A-frames 116 are rigidly connected to fan case 108 at 251 and to a compressor intermediate case 203. Also, rigid structure 250 extends between the fan exit guide vane 114 and a fan intermediate case 99.

While the fan exit guide vanes 114 and the A-frames 116 are shown connected to particular structure in the engine, for purposes of understanding the scope of this application, they could be connected to other locations within an inner core engine at other locations.

As shown, the low pressure compressor 112 has five rotating stages. In embodiments the low pressure compressor has four to six stages, which is longer than the first generation gas turbine engine manufactured by Applicant mentioned above. With such a long low pressure compressor 112, mounting challenges are raised. In addition, the use of such a long low pressure compressor increases the length of the low pressure compressor, and an overall length of the engine.

As can been seen from FIG. 2A, fan exit guide vanes 114 extend from an inner point 200 secured to structure 250 at an angle to a radially outer point 201, with the angle having a component in a radially outer direction, and another component in an axially aft direction. Conversely, the A-frames 116 extend from a radially inner point 202 attached to compressor intermediate case 203, radially outwardly at an angle to an outer point 251 connected to the fan case 108. Note that the A-frames 116 may be attached to the case 203 through intermediate static structure. However, there is a load path between the A-frame legs and the inner core engine. The angle of the A-frame 116 has a component in a radially outer direction and another component in an axially forward direction.

As shown in FIG. 2A, fan intermediate case 99 is upstream of the first rotor stage of the low pressure compressor has a moment stiffness D. Rigid structure 250 which extends between case 99 and the fan exit guide vanes 114 has a moment stiffness E. There is also a combined moment stiffness F of the fan exit guide vanes 114 and A-frames 116. Moment stiffness is defined as the stiffness measured when the engine is loaded with a moment load in the yaw or pitch of the engine. Such loads may be created, for example, during take-off rotation or flight turning maneuvers.

Both cases 99 and 203 have a plurality of circumferentially spaced struts. A line Z is shown that can pass through fan exit guide vanes 114, rigid structure 250 and fan intermediate case 99.

In prior art engines incorporating fan exit guide vanes and A-frames, the moment stiffness of E of the structure connecting the fan exit guide vanes to the core engine has been relatively low. However, Applicant has recognized that once one incorporates a gear reduction 104, such prior art structures may not be sufficiently stiff.

Thus, the rigid structure 250 is made to be relatively stiff. In embodiments, a ratio of the moment stiffness E to the moment stiffness D is between 5 and 15. Further, a ratio of the moment stiffness E to the combined moment stiffness F is between 1.5 and 8.

As can be seen in FIG. 2A, there is a continuous upper wall 400 to the rigid structure 250 in this embodiment. Moreover, the rigid structure 250 is pinned to retain the fan exit guide vanes 114 in both a circumferential and a radial direction. If non-structural fan exit guide vanes are used they need not necessarily be constrained in the radial direction.

Figure 2B:
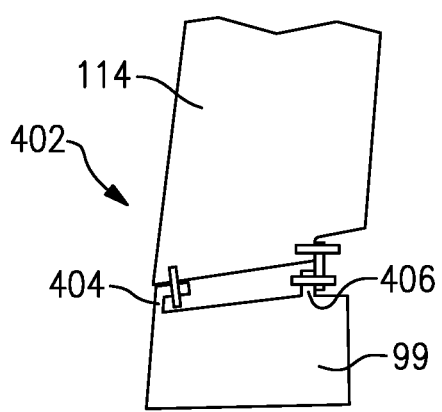
FIG. 2B shows another embodiment.

FIG. 2B shows an embodiment 402 wherein the rigid structure does not have a continuous upper wall, but rather has two axially spaced wall portions 404 and 406 pinned to retain the fan exit guide vane 114.

Figure 2C:
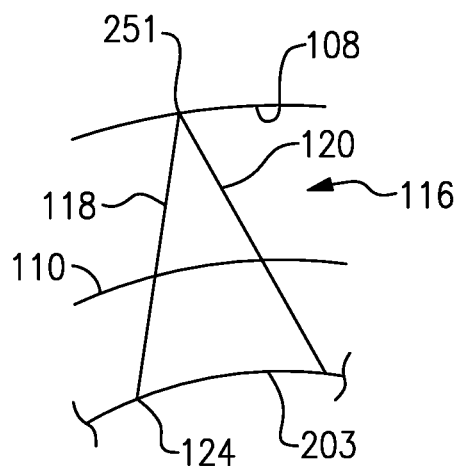
FIG. 2C shows a detail of the FIG. 2A engine.

As shown in FIG. 2C, each A-frame 116 includes a pair of legs 118 and 120. The two are attached to the fan case 108 at a connection point 251. It should be understood that there may not be a single "point" 251, but the two legs are closely spaced where connected to fan case 108. From connection point 251, the two legs 118 and 120 extend in opposed circumferential direction through the splitter wall 110 and are fixed to the case 203 at points 124.

FIG. 3A shows yet another feature. In FIG. 3A an engine 125 has a fan casing 150 and a core housing 152. A fan exit guide vane 154 extends from the core housing 152 to the fan case 150. Note that this embodiment could be utilized with A-frames (shown at 147), or only with fan exit guide vanes 154. A nose cone 160 rotates with a fan 42. A gear reduction 104 is driven by a fan drive turbine 156 to in turn drive the fan rotor 42 at a slower speed than the fan drive turbine 156. Fan drive turbine 156 further drives a low pressure compressor 151, which may be similar to the low pressure compressor of FIG. 2A. A high pressure turbine 157 drives a high pressure compressor 153. A combustor 159 is also illustrated. All of the fan compressor and turbine components rotate about an axis 167.

As shown, a mid-turbine frame 161 is positioned between turbines 156 and 157. As also shown an exhaust nozzle 155 is downstream of the fan drive turbine 156.

A schematic mount for mounting the engine 125 to an aircraft may include a first mount 163 fixed at 166 to fan case 150. As shown, the point 166 may be axially aligned, and radially outward, of at least a portion of fan exit guide vane 154. A second rear mount 164 is fixed to core housing 152 at a point 165 which may be aligned with the mid-turbine frame 161. The second mount also attaches the engine to an aircraft. An aircraft is shown schematically at 400. A first axial length of the distance $d_1$ is defined between a trailing edge of the mount 163 and a trailing edge of the mount 164. The line $d_1$ may be measured from a radially innermost end of the trailing edge of the mount 163 and the radially innermost point of the mount 164. However, line $d_1$ is measured to be parallel to a rotational axis of the engine, or at extended point 300.

A second distance $d_2$ is defined between an axially forwardmost point 162 of engine 125 and an axially rearmost point 158 of the engine 125. Again, the line for $d_2$ is measured to be parallel to the rotational axis of the engine 125. In essence, both $d_1$ and $d_2$ may be defined by extending the points of measurement, and drawing a line between the two points which is parallel to the rotational axis.

FIG. 3B shows an alternative embodiment wherein the forward mount 263 extends within the inner core housing and is attached to a fan compressor intermediate case 203. In this embodiment, the distance $d_1$ is still measured from the trailing edge of the mount 263 to a trailing edge of the mount 164.

Given the longer low pressure compressor 112, an overall length of the engine is increased, as mentioned above. Thus, a length ratio may be defined as $d_1/d_2$. In embodiments, the length ratio may be between 0.4 and 0.7 for a fan case mount (FIG. 3A) and 0.4 to 0.6 for a core mount (FIG. 3B) to the compressor intermediate case.

A gas turbine engine under this disclosure could be said to include a fan rotor driven by a fan drive turbine about an axis through a gear reduction to reduce a speed of the fan rotor relative to a speed of the fan drive turbine. A fan case surrounds the fan rotor, and an inner core engine has an inner core engine housing surrounding a compressor section, including a low pressure compressor. The fan rotor delivers air into a bypass duct defined between the fan case and a splitter wall of the inner core housing. A rigid connection between the fan case and the inner core engine includes a plurality of A-frames each including a pair of legs rigidly connected at a connection point to the fan case. Each leg in the pair extends away from the connection point in opposed circumferential directions to be connected to the inner core engine to form an A-shape. A plurality of fan exit guide vanes are rigidly connected to the fan case, and rigidly connected to the inner core engine. A fan intermediate case is positioned within the inner compressor wall forward of a first rotor stage in the low pressure compressor. A rigid structure is connected to the inner core engine and the fan exit guide vanes. The rigid structure defines a structure moment stiffness, and the fan intermediate case defines an intermediate case moment stiffness. A ratio of the structure moment stiffness to the intermediate case moment stiffness being between 5 and 15.

A gas turbine engine under this disclosure could also be said to include a fan rotor driven by a fan drive turbine about an axis through a gear reduction to reduce a speed of the fan rotor relative to a speed of the fan drive turbine. A fan case surrounds the fan rotor, and an inner core engine has an inner core housing surrounding a compressor section, including a low pressure compressor. The fan rotor delivers air into a bypass duct defined between the fan case and a splitter wall of the inner core housing. A rigid connection between the fan case and the inner core engine includes a plurality of A-frames each including a pair of legs rigidly connected at a connection point to the fan case. Each leg in the pair extends away from the connection point in opposed circumferential directions to be connected to the inner core engine to form an A-shape. A plurality of fan exit guide vanes are rigidly connected to the fan case, and rigidly connected to the inner core engine. A fan intermediate case is positioned within the inner compressor wall forward of a first rotor stage in the low pressure compressor. A rigid structure is connected to the inner core engine and the fan exit guide vanes. The rigid structure defines a structure moment stiffness, a combination of the plurality of A-frames, and the plurality of fan exit guide vanes, together defining an outer mount moment stiffness, and a ratio of the strut moment stiffness to the outer mount moment stiffness being between 1.5 and 8.

A gas turbine engine under this disclosure could also be said to include a compressor section having a low pressure compressor, a high pressure compressor and a compressor intermediate case. A fan rotor is driven by a fan drive turbine about an axis through a gear reduction to reduce a speed of the fan rotor relative to a speed of the fan drive turbine. A fan case surrounds the fan rotor. An inner core housing surrounds the compressor section and a turbine section. A first mount for the engine is attached to one of the fan case or the compressor intermediate case. A second mount for the engine is attached to the inner core housing. An axial length of the engine is defined between a forwardmost point of the engine and a rearwardmost point of the engine and a mount distance is defined between a trailing edge of the first mount and a trailing edge of the second mount. Each of the trailing edges are measured from a radially innermost end. A ratio of the mount distance to the axial length is between 0.4 and 0.7 if the first mount is attached to the fan case, and is between 0.4 and 0.6 when the forward mount is attached to the compressor intermediate case.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine comprising:
    a fan rotor driven by a fan drive turbine about an axis through a gear reduction to reduce a speed of said fan rotor relative to a speed of said fan drive turbine;
    a fan case surrounding said fan rotor, and an inner core engine having an inner core engine housing surrounding a compressor section, including a low pressure compressor;
    said fan rotor delivering air into a bypass duct defined between said fan case and a splitter wall of said inner core engine housing, and a rigid connection between said fan case and said inner core engine including a plurality of A-frames each including a pair of legs rigidly connected at a connection point to said fan case, and each leg in said pair extending away from said connection point in opposed circumferential directions to be connected to said inner core engine to form an A-shape;
    a plurality of fan exit guide vanes rigidly connected to said fan case, and rigidly connected to said inner core engine; and
    a fan intermediate case positioned within a compressor housing wall forward of a first rotor stage in said low pressure compressor;
    a rigid structure connected to said inner core engine and to said fan exit guide vanes; and
    said rigid structure defining a structure moment stiffness, and said fan intermediate case defining an intermediate case moment stiffness, and a ratio of said structure moment stiffness to said intermediate case moment stiffness being between 5 and 15.

2. The gas turbine engine as set forth in claim 1, wherein a combination of said plurality of A-frames, and said plurality of fan exit guide vanes, together defines an outer mount moment stiffness, and a ratio of said structure moment stiffness to said outer mount moment stiffness being between 1.5 and 8.

3. The gas turbine engine as set forth in claim 1, wherein said engine has a forwardmost point and a rearwardmost point, and an axial length of the engine defined between said forwardmost and rearwardmost points, and a forward mount attached at a forward location on said fan case, and a rearward mount attached on said inner core engine housing, said forward mount and said rearward mount for attaching the engine to an aircraft, and a mount distance defined between a trailing edge of said forward mount and a trailing edge of said rearward mount, and a ratio of said mount distance to said axial length of said engine is between 0.4 and 0.7.

4. The gas turbine engine as set forth in claim 3, wherein said forward mount is aligned with at least a portion of said fan exit guide vanes.

5. The gas turbine engine as set forth in claim 1, wherein said engine has a forwardmost point and rearwardmost point and an axial length of the engine defined between said forwardmost and said rearwardmost points and a forward mount attached at a forward location to a compressor intermediate case which is intermediate the low pressure compressor and a high pressure compressor, and a rearward mount attached to said inner core engine housing, said forward mount and said rearward mount for attaching the engine to an aircraft, and a mount distance defined between a trailing edge of said forward mount and a trailing edge of said rearward mount and a ratio of said mount distance to said axial length of said engine is between 0.4 and 0.6.

6. The gas turbine engine as set forth in claim 1, wherein a single line can pass through a portion of said fan exit guide vanes, said rigid structure, and said fan intermediate case.

7. The gas turbine engine as set forth in claim 1, wherein said low pressure compressor has four to six stages.

8. The gas turbine engine as set forth in claim 1, wherein said fan exit guide vanes extend at a first angle from a radially inner end to a radially outer end, and said first angle having a radially outward component and an axially aft component, and said A-frame legs extending from a radially inner connection to said inner core engine to said connection point with said fan case at a second angle having a component in a radially outward direction, and in an axially forward direction.

9. The gas turbine engine as set forth in claim 1, wherein said A-frame legs are connected to said inner core engine at a compressor intermediate case defined between said low pressure compressor and a high pressure compressor.

10. The gas turbine engine as set forth in claim 1, wherein said rigid structure is fixed to said fan intermediate case.

11. A gas turbine engine comprising:
    a fan rotor driven by a fan drive turbine about an axis through a gear reduction to reduce a speed of said fan rotor relative to a speed of said fan drive turbine;
    a fan case surrounding said fan rotor, and an inner core engine having an inner core engine housing surrounding a compressor section, including a low pressure compressor;
    said fan rotor delivering air into a bypass duct defined between said fan case and a splitter wall of said inner core engine housing, and a rigid connection between said fan case and said inner core engine including a plurality of A-frames each including a pair of legs rigidly connected at a connection point to said fan case, and each leg in said pair extending away from said connection point in opposed circumferential directions to be connected to said inner core engine to form an A-shape;
    a plurality of fan exit guide vanes rigidly connected to said fan case, and rigidly connected to said inner core engine; and
    a fan intermediate case positioned within a compressor housing wall forward of a first rotor stage in said low pressure compressor;
    a rigid structure connected to said inner core engine and said fan exit guide vanes; and
    said rigid structure defining a structure moment stiffness, a combination of said plurality of A-frames, and said plurality of fan exit guide vanes, together defining an outer mount moment stiffness, and a ratio of said structure moment stiffness to said outer mount moment stiffness being between 1.5 and 8.

12. The gas turbine engine as set forth in claim 11, wherein said engine has a forwardmost point and a rearwardmost point, and an axial length of the engine defined between said forwardmost and rearwardmost points, and a forward mount attached at a forward location on said fan case or compressor intermediate case, and a rearward mount attached to said inner core engine housing, said forward mount and said rearward mount for attaching the engine to an aircraft, and a mount distance defined between a trailing edge of said forward mount and a trailing edge of said rearward mount, and a ratio of said mount distance to said axial length of said engine is between 0.4 and 0.7.

13. The gas turbine engine as set forth in claim 11, wherein said engine has a forwardmost point and rearwardmost point and an axial length of the engine defined between said forwardmost and said rearwardmost points and a forward mount attached at a forward location to a compressor intermediate case which is intermediate the low pressure compressor and a high pressure compressor, and a rearward mount attached to said inner core engine housing, said forward mount and said rearward mount for attaching the engine to an aircraft, and a mount distance defined between a trailing edge of said forward mount and a trailing edge of said rearward mount and a ratio of said mount distance to said axial length of said engine is between 0.4 and 0.6.

14. The gas turbine engine as set forth in claim 11, wherein a single line can pass through a portion of said fan exit guide vanes, said rigid structure, and said fan intermediate case, and said low pressure compressor has four to six stages.

* * * * *